United States Patent
Kikuchi et al.

(10) Patent No.: US 6,855,448 B2
(45) Date of Patent: Feb. 15, 2005

(54) FUEL CELL STACK

(75) Inventors: Hideaki Kikuchi, Kawachi-gun (JP);
Seiji Sugiura, Utsunomiya (JP);
Yoshinori Wariishi, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 296 days.

(21) Appl. No.: 10/112,818

(22) Filed: Mar. 29, 2002

(65) Prior Publication Data

US 2002/0142209 A1 Oct. 3, 2002

(30) Foreign Application Priority Data

Mar. 30, 2001  (JP) ........................................ 2001-099545

(51) Int. Cl.[7] ............................ H01M 8/02; B60R 16/04
(52) U.S. Cl. ........................................ 429/34; 180/68.5
(58) Field of Search ...................... 180/68.5; 429/34–39

(56) References Cited

U.S. PATENT DOCUMENTS 6,562,506 B1 * 5/2003 D'Aleo et al. ................. 429/34

FOREIGN PATENT DOCUMENTS

| JP | 07-249426 A | 9/1995 |
| JP | 07-335243 A | 12/1995 |
| JP | 09-092324 A | 4/1997 |
| JP | 2000-48850 A | 2/2000 |
| JP | 2000-299121 A | 10/2000 |

* cited by examiner

Primary Examiner—Suzy Tsang-Foster
(74) Attorney, Agent, or Firm—Lahive & Cockfield, LLP; Anthony A. Laurentano, Esq

(57) ABSTRACT

A cell stack, in which a plurality of cell units are stacked, is accommodated in a case which has a bottom plate, a first side plate, a second side plate, and a ceiling plate. End plates are arranged at both open ends of the case. The case and the end plates are connected to one another by a hinge mechanism in which pins are engaged into through-holes of tab sections to provide a fuel cell stack.

6 Claims, 6 Drawing Sheets

FUEL CELL STACK

BACKGROUND OF THE INVENTION

1. Field of the Invention

The present invention relates to a fuel cell stack having a compact size and a light weight.

2. Description of the Related Art

A magnified sectional view illustrating major parts of a general fuel cell stack is shown in FIG. 5. The fuel cell stack 10 comprises a cell stack 13 in which a plurality of cell units 12 are electrically connected to one another in series and they are stacked in the horizontal direction as shown in FIG. 5.

The cell unit 12 comprises a unified body 20 which includes an electrolyte layer 18 positioned between an anode 14 and a cathode 16, and a pair of separators 22a, 22b which interpose the unified body 20 therebetween. In each of the both separators 22a, 22b, a first gas flow passage 24 for supplying and discharging the fuel gas (for example, hydrogen-containing gas containing a major component of hydrogen) with respect to the anode 14 is provided on the surface opposed to the anode 14, and a second gas flow passage 26 for supplying and discharging the oxygen-containing gas (for example, gas containing oxygen) with respect to the cathode 16 is provided on the surface opposed to the cathode 16. The unified body 20 is accommodated in an opening of a frame-shaped seal member 30.

Terminal electrodes 34a, 34b are electrically connected to the cell units 12, 12 which are positioned at both ends of the cell stack 13. Further, end plates 38a, 38b are arranged outside of the terminal electrodes 34a, 34b with electric leakage-preventive insulating plates 36a, 36b intervening therebetween respectively. Backup plates 40a, 40b are arranged outside of the respective end plates 38a, 38b respectively. A plurality of coned disc springs 42 are arranged between the end plate 38a and the backup plate 40a.

A plurality of through-holes 44, which extends from one backup plate 40a to the other backup plate 40b, are formed through outer circumferential edges of the fuel cell stack 10. As shown in FIGS. 5 and 6, tie rods 46 are inserted into the through-holes 44 respectively. Both of the backup plates 40a, 40b are tightened by nuts 48 screw-engaged with the tie rods 46 (see FIG. 5), and thus the cell stack 13, the terminal electrodes 34a, 34b, and the end plates 38a, 38b are tightened. Accordingly, the coned disc springs 42 are compressed.

A fuel gas supply/discharge mechanism is connected to a first gas inlet passage 62 (see FIG. 6) and a first gas outlet passage 64 of the fuel cell stack 10. On the other hand, an oxygen-containing gas supply/discharge mechanism is connected to a second gas inlet passage 66 and a second gas outlet passage 68. A cooling water supply/discharge mechanism is connected to a cooling water inlet passage 70 and cooling water outlet passage 71 respectively. In FIG. 6, reference numeral 74 indicates mounting boss sections which are provided with through-holes (not shown) for inserting bolts (connecting members) to connect the fuel cell stack 10 to an automobile body.

When the fuel cell stack 10 as described above is operated, then the hydrogen-containing gas is supplied to the anodes 14, and the oxygen-containing gas such as air is supplied to the cathodes 16, while allowing the cooling water to flow through the fuel cell stack 10. The hydrogen in the hydrogen-containing gas is ionized on the anode 14 as represented by the following reaction formula (A). As a result, hydrogen ion and electron are generated.

$$2H_2 \rightarrow 4H^+ + 4e \qquad (A)$$

The hydrogen ion is moved via the electrolyte layer 18 to the cathode 16. The electron is extracted by an external circuit which is electrically connected to the anode 14 and the cathode 16. The electron is utilized as DC electric energy for energizing the external circuit.

Subsequently, the electron arrives at the cathode 16. The electron causes the reaction represented by the following reaction formula (B) together with the hydrogen ion moved to the cathode 16 and the oxygen in the oxygen-containing gas supplied to the cathode 16. Thus, water is generated.

$$O_2 + 4H^+ + 4e \rightarrow 2H_2O \qquad (B)$$

The operating fuel cell stack 10 which is thermally expanded compresses or elongates the coned disc springs 42 depending upon the amount of thermal expansion. Accordingly, the tightening force exerted on the cell stack 13 is maintained substantially equivalently in the thermally expanded fuel cell stack 10 as well.

The fuel cell stack 10, in which the backup plates 40a, 40b are mutually tightened with the tie rods 46 as described above, has a large external size, for the following reason. That is, it is necessary to provide any hole formation margin S for forming the through-hole 44 in order to allow the tie rod 46 to pass therethrough (see FIG. 6).

It is necessary that the tightening forces of the respective tie rods 46 are equivalent. The operating fuel cell stack 10 which is thermally expanded may lower the tightening force at a portion at which the tie rod 46 is loosely tightened as compared with other portions. As a result, any contact failure occurs in the cell stack 13 and the internal resistance is increased, deteriorating the power generation characteristics of the fuel cell stack 10 in some cases. Therefore, the thick backup plates 40a, 40b are used so that the large tightening force of the tie rods 46 may not cause any flexion. However, the thick backup plates 40a, 40b increase the size of the fuel cell stack 10 in the stacking direction. In other words, the external size of the fuel cell stack 10 is increased. For this reason, the weight of the fuel cell stack 10 is increased as well. Therefore, it is necessary to apply a large driving force for driving the automobile carrying the fuel cell stack 10.

A structure for holding the fuel cell stack without using any tie rod is known, in which the fuel cell stack is accommodated, for example, in an accommodating case or a stack, as described in Japanese Laid-Open Patent Publication Nos. 7-249426, 7-335243, and 9-92324. Japanese Laid-Open Patent Publication No. 2000-48850 suggests that two pressure plates are connected to one another at each of their four corner portions respectively with a holding member having a substantially L-shaped cross section.

Although a compact size can be realized for the fuel cell stack in any one of the foregoing cases, it is difficult to pressurize the cell units with an equivalent tightening force. The operating fuel cell stack which is thermally expanded increases the internal resistance of the fuel cell stack.

For example, when the amount of thermal expansion of the cell stack is large as compared with the holding member, the stack container, or the accommodating case having high rigidity, the thermal expansion of the cell stack is suppressed. As a result, an extremely large thermal stress is applied to the cell stack. Then, the constitutive member of the fuel cell stack is finally deformed in some cases. Consequently, the contact failure occurs in the cell stack, increasing the internal resistance of the fuel cell stack.

SUMMARY OF THE INVENTION

It is an object of the present invention to provide a fuel cell stack having a compact size and a light weight in which a stack of cell units can be easily pressurized with an equivalent tightening force, and it is possible to maintain the electric contact between constitutive members suitably.

In order to achieve the object, the present invention resides in a fuel cell stack comprising a stack including a predetermined number of cell units which are electrically connected to one another in series, the cell units each including a unified body and a pair of separators for supporting the unified body interposed therebetween, the unified body having an anode supplied with a fuel gas, a cathode supplied with an oxygen-containing gas, and an electrolyte arranged between the anode and the cathode, and the pair of separators each having a fuel gas supply passage for supplying the fuel gas or an oxygen-containing gas supply passage for supplying the oxygen-containing gas, the fuel cell stack further comprising end plates which are arranged outside of the stack respectively with terminal electrodes intervening therebetween, wherein the stack and the terminal electrodes are accommodated in a case which has at least one detachable side surface; and the end plates are connected to open ends of the case by a hinge mechanism.

In the above fuel cell stack, the stack is kept tightened by the case and the end plates. That is, it is unnecessary to provide any tie rod and, therefore, unnecessary to provide any hole formation margin for forming the through-hole into which the tie rod is inserted. It is also unnecessary to use any backup plate. Furthermore, even the thin-walled end plates make it possible to hold the stack with a substantially equivalent tightening force. That is, in the fuel cell stack of the present invention, the end plates have compact sizes and are thin-walled. The backup plate is not used as far as possible. Accordingly, the fuel cell stack can have a compact size and a light weight.

The stack is accommodated in the case. Therefore, an assembling operator or other objects do not contact, for example, with the terminal electrodes and the separators. Accordingly, it is possible to prevent the assembling operator from any electric shock.

Even when the operating fuel cell stack causes any thermal expansion, it is possible to maintain the substantially equivalent tightening force to be exerted on the stack. Accordingly, the electric contact is appropriately maintained between the members of the fuel cell stack, for example, between the separator and the unified body. Therefore, it is possible to avoid any deterioration of the power generation characteristics which would be otherwise caused by the increase in internal resistance of the fuel cell stack.

Further, the cell units can be accommodated in the case with ease, because at least the one end surface of the case is detachable.

Furthermore, the end plates and the case are connected to one another by the hinge mechanism. Accordingly, when the fuel cell stack is thermally expanded, the end plates are flexibly bent at central portions with ease about the support points of the hinge mechanism. That is, the thermal expansion of the fuel cell stack is not obstructed. Therefore, it is possible to prevent any thermal stress from being applied to the fuel cell stack.

The case made of a metal material may be spaced from the terminal electrodes. Accordingly, it is possible to avoid the flow of current from the terminal electrodes to the case, i.e., it is possible to avoid any electric leakage.

Alternatively, in order to avoid any electric leakage, an internal surface of the case made of a metal material may be coated with an insulating material.

The fuel cell stack may be carried on an automobile body or the like. Then, each of the end plates may have a mounting boss section for inserting a connecting member in order to connect the fuel cell stack and the automobile body to one another.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 5:
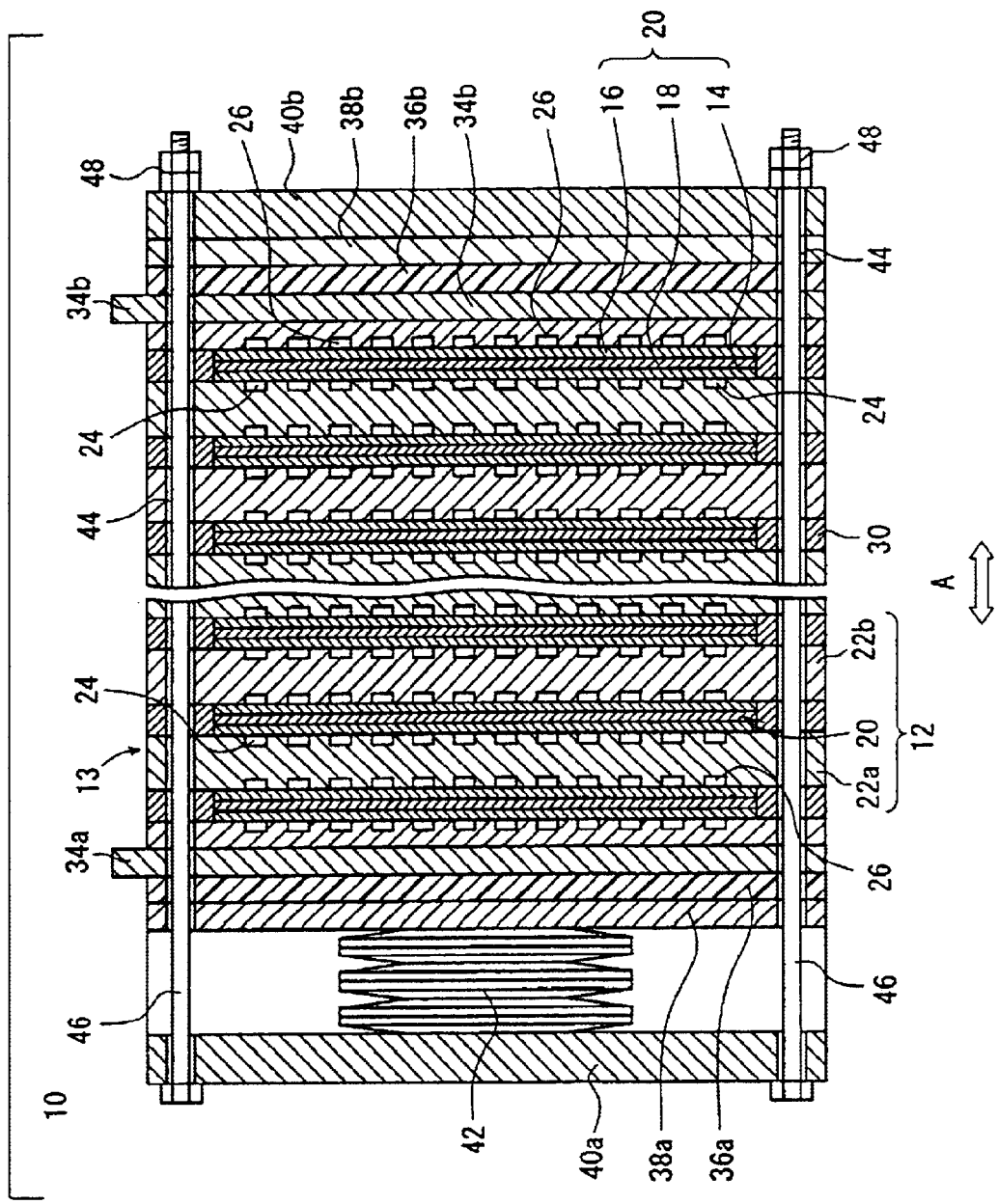
FIG. 5 is a magnified sectional view illustrating major parts of a fuel cell stack concerning the conventional technique.
Figure 6:
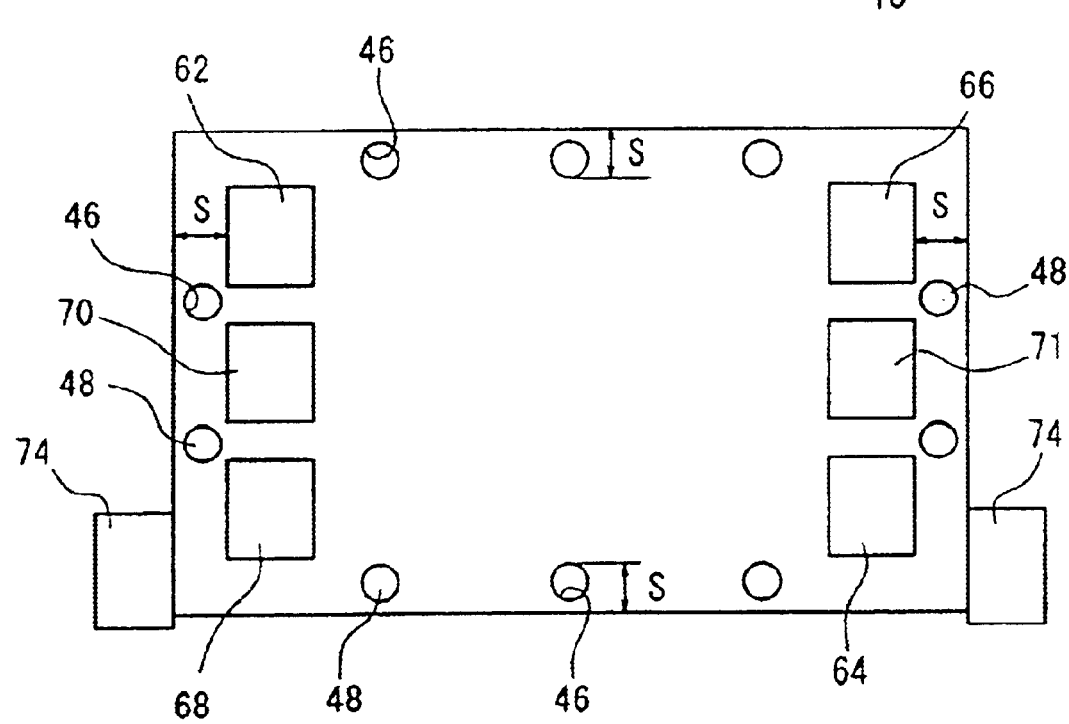
FIG. 6 is a front view schematically illustrating the fuel cell stack shown in FIG. 5.

The fuel cell stack according to the present invention will be exemplified by a preferred embodiment below, which will be explained in detail with reference to the accompanying drawings. The same constitutive components as the constitutive components shown in FIGS. 5 and 6 are designated by the same reference numerals, detailed explanation of which will be omitted in some cases.

Figure 1:
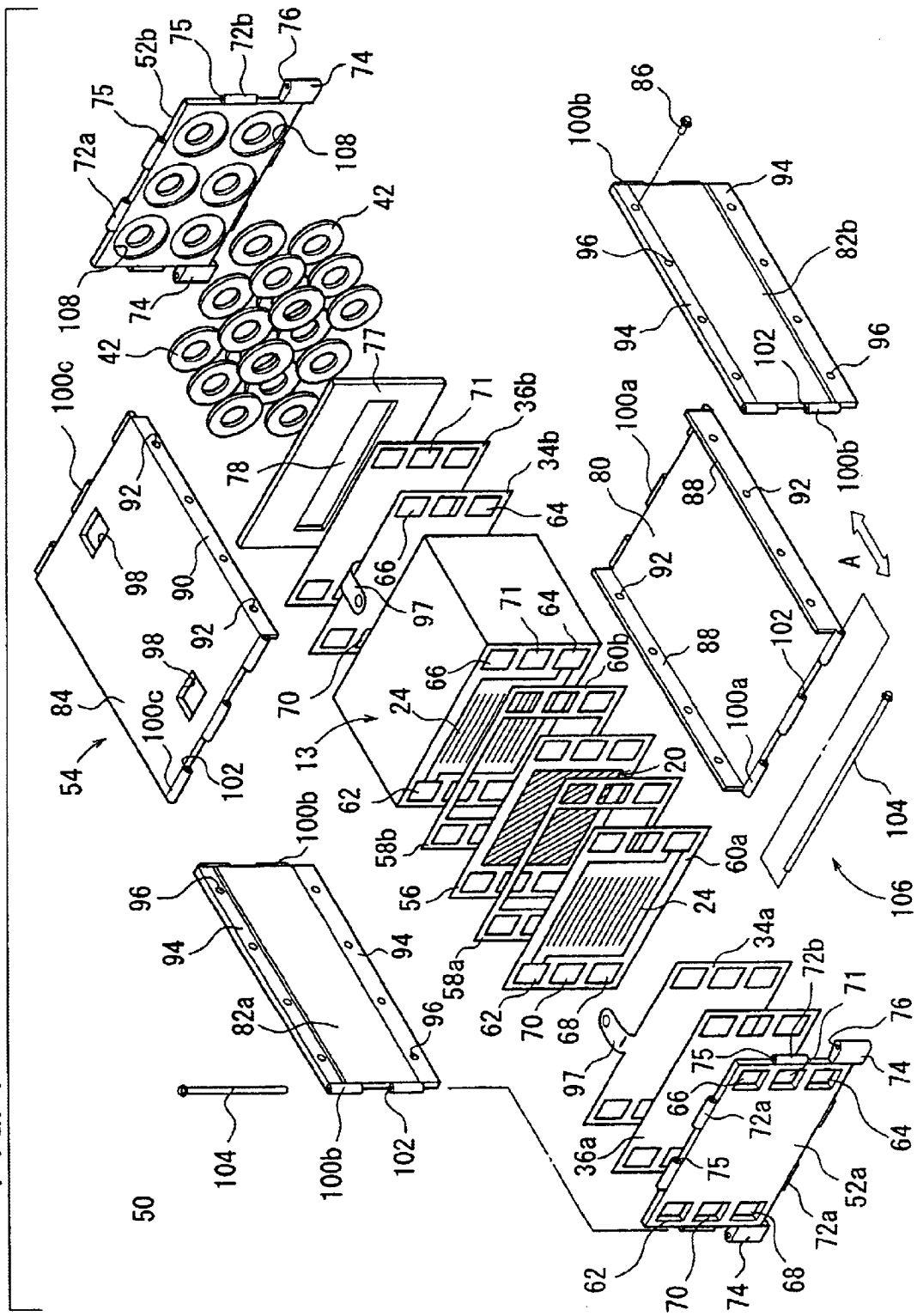
FIG. 1 is a perspective view schematically illustrating a fuel cell stack according to an embodiment of the present invention as a whole.

As shown in FIG. 1, the fuel cell stack 50 comprises a cell stack 13 including a plurality of cell units 12 which are stacked in the direction of the arrow A and which are electrically connected to one another in series, end plates 52a, 52b arranged outside of the cell units 12, 12 which are positioned at both ends of the cell stack 13 respectively with terminal electrodes 34a, 34b intervening therebetween, and a case 54 for accommodating the cell stack 13.

Figure 2:
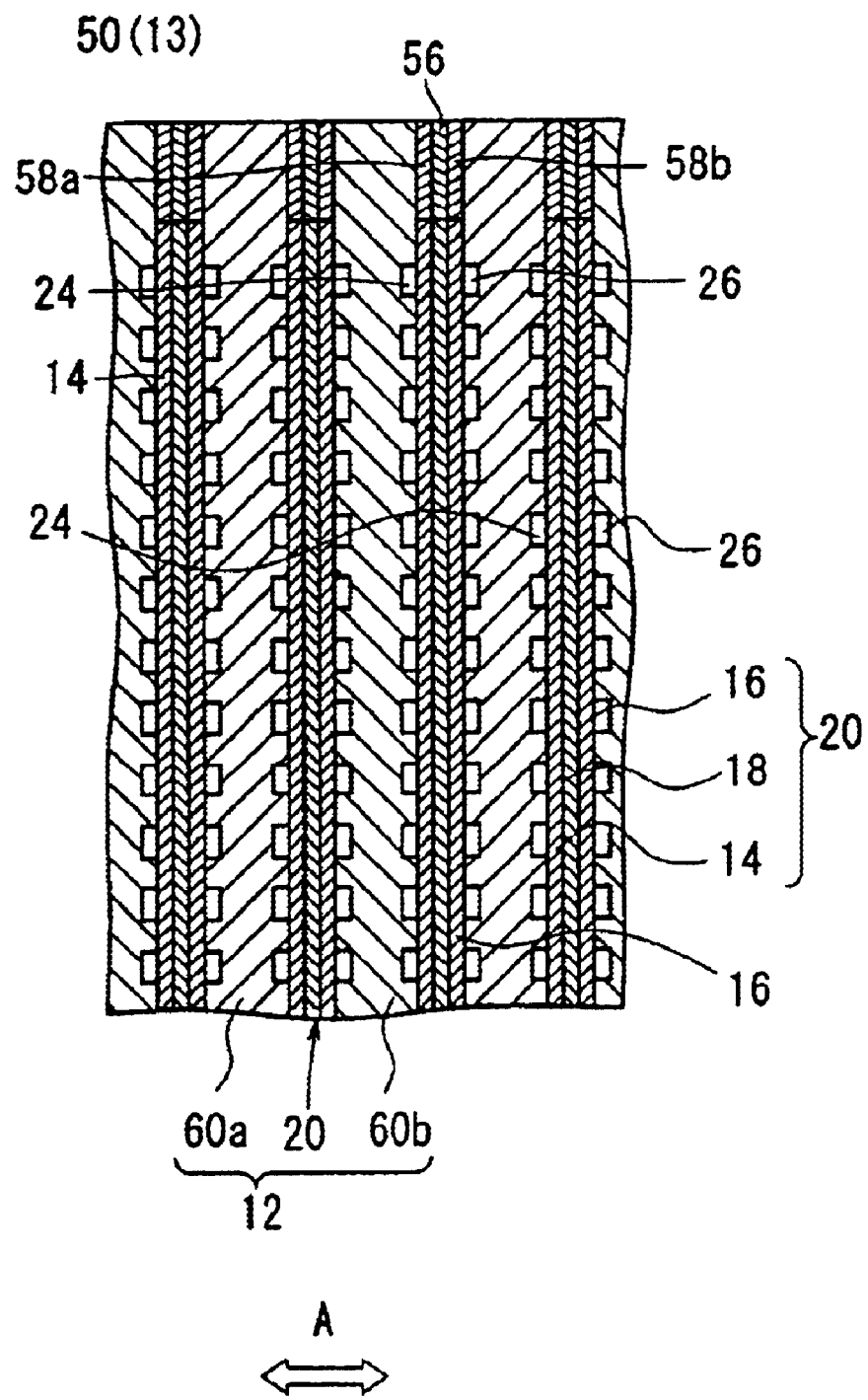
FIG. 2 is a magnified sectional view illustrating major parts of the fuel cell stack shown in FIG. 1.

As shown in FIG. 2, the cell unit 12 has a unified body 20. The unified body 20 comprises an electrolyte layer 18 arranged between an anode 14 and a cathode 16. A hydrogen ion conductor, which is obtained, for example, by impregnating a thin membrane of polytetrafluoroethylenesulfonic acid with water, is used for the electrolyte layer 18.

Each of the anode 14 and the cathode 16 includes a gas diffusion layer (not shown) which is made of a material of carbon cloth or the like, and an electrode catalyst layer (not shown) in which porous carbon particles with platinum alloy carried on the surfaces are uniformly applied to the surface of the gas diffusion layer. The anode 14 and the cathode 16 are joined to the electrolyte layer 18 so that the electrode catalyst layers are opposed to one another with the electrolyte layer 18 intervening therebetween. The electrolyte layer 18 is accommodated in an opening of a frame-shaped seal member 56. On the other hand, the cathode 16 or the anode 14 is accommodated in an opening of each of gaskets 58a, 58b. The cell unit 12 is constructed such that the gaskets 58a, 58b and the frame-shaped seal member 56 for holding the unified body 20 are interposed by a pair of separators 60a, 60b.

Figure 3:
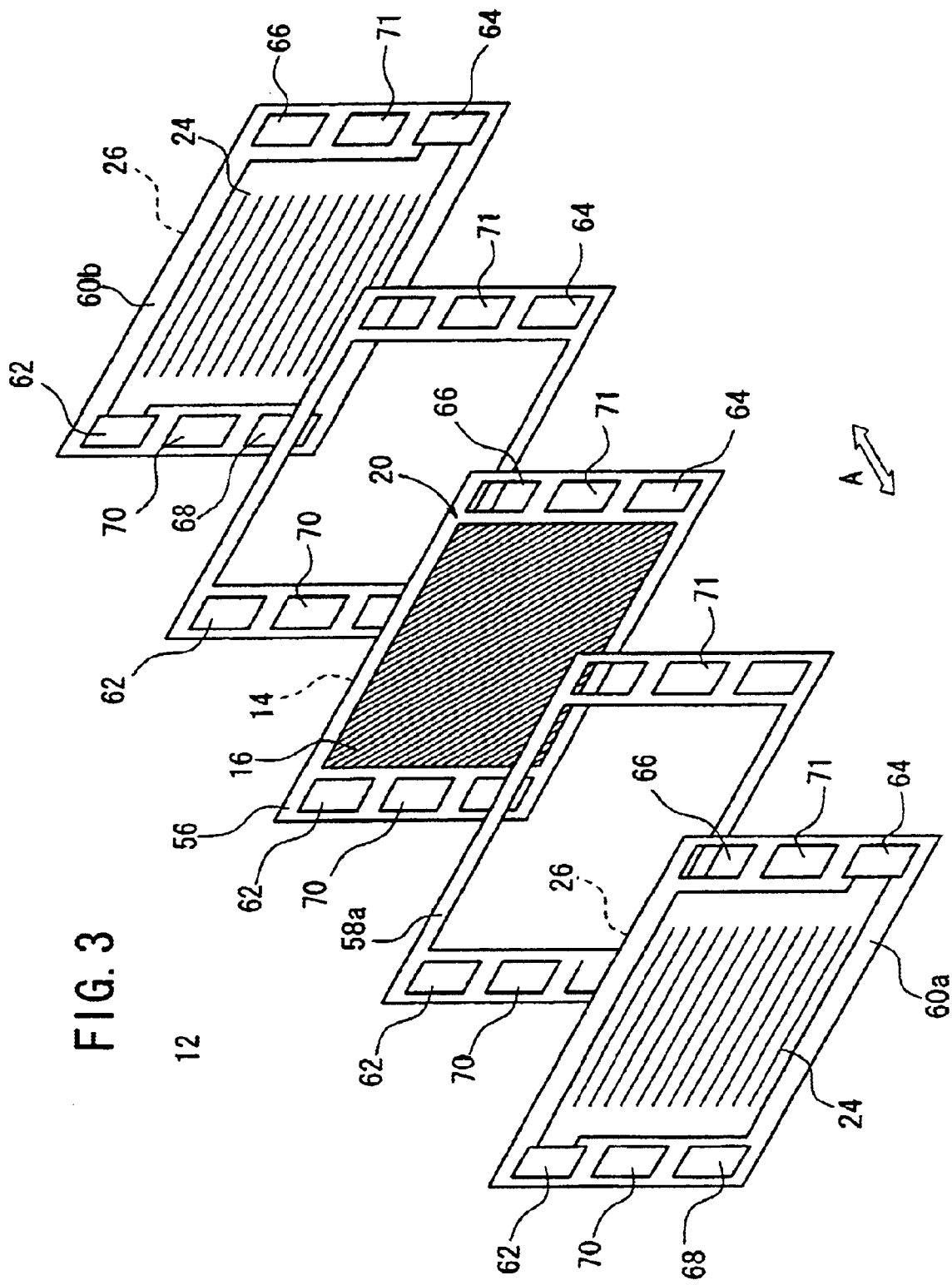
FIG. 3 is a perspective view schematically illustrating a cell unit of the fuel cell stack shown in FIG. 1 as a whole.

As shown in FIG. 3, a first gas flow passage 24 and a second gas flow passage 26 are also provided for each of the separators 60a, 60b.

In this arrangement, a first gas inlet passage 62 for allowing the hydrogen-containing gas to pass therethrough is provided at each of upper left ends of the end plate 52a, the separators 60a, 60b, the gaskets 58a, 58b, and the frame-shaped seal member 56. A first gas outlet passage 64 for allowing the unreacted hydrogen-containing gas to pass therethrough is provided at each of their diagonal positions (see FIG. 1). Similarly, a second gas inlet passage 66 for allowing the oxygen-containing gas to pass therethrough is provided at each of upper right ends of the end plate 52a, the separators 60a, 60b, the gaskets 58a, 58b, and the frame-shaped seal member 56. A second gas outlet passage 68 for allowing the unreacted oxygen-containing gas to pass therethrough is provided at each of their diagonal positions. Each of the first gas inlet passage 62 and the first gas outlet passage 64 communicates with the first gas flow passage 24. On the other hand, each of the second gas inlet passage 66 and the second gas outlet passage 68 communicates with the second gas flow passage 26.

A cooling water inlet passage 70 and a cooling water outlet passage 71 are provided between the first gas inlet passage 62 and the second gas outlet passage 68 and between the second gas inlet passage 66 and the first gas outlet passage 64 for each of the end plate 52a, the separators 60a, 60b, the gaskets 58a, 58b, and the frame-shaped seal member 56.

Figure 4:
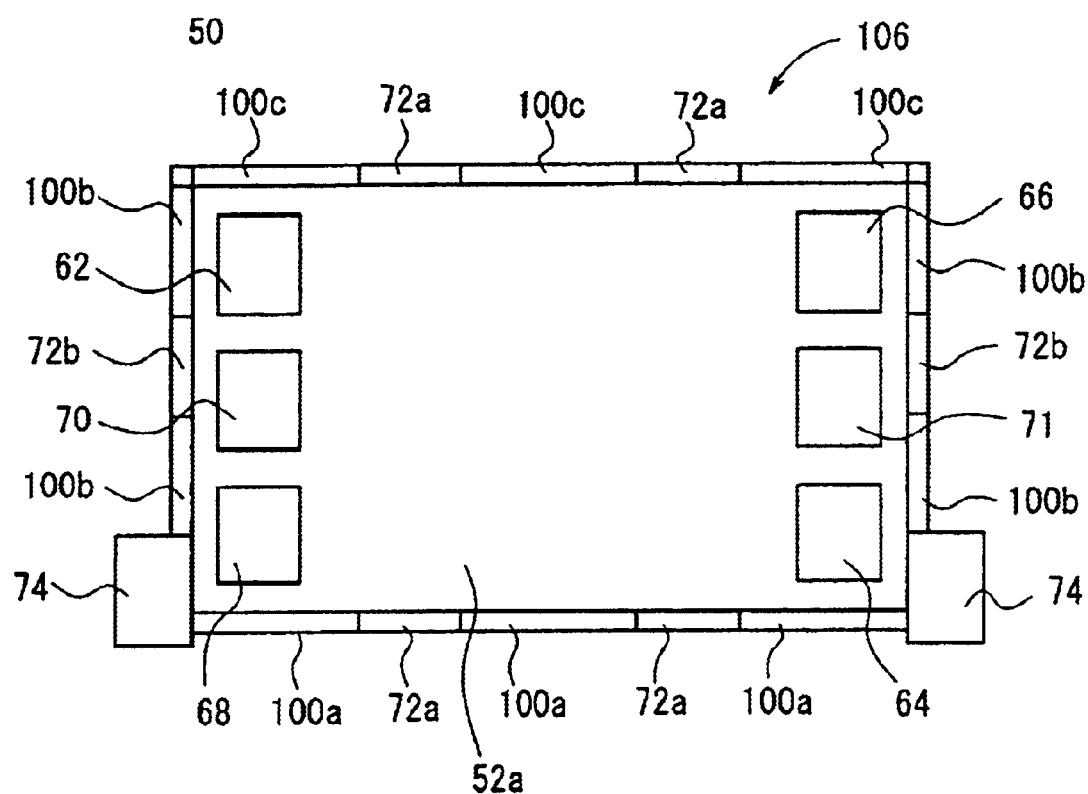
FIG. 4 is a front view schematically illustrating the fuel cell stack shown in FIG. 1.

As shown in FIGS. 1 and 4, a plurality of tab sections 72a, 72b protrude on upper and lower side surfaces or right and left side surfaces respectively at circumferential edges of the end plates 52a, 52b which are arranged outside of the cell units 12, 12 positioned at the both ends of the cell stack 13 with electric leakage-preventive insulating plates 36a, 36b intervening therebetween. Mounting boss sections 74, 74 also protrude at lower portions of the right and left side surfaces of the end plates 52a, 52b as shown in FIGS. 1 and 4. Through-holes 75, 76 are formed through the tab sections 72a, 72b and the mounting boss sections 74, 74 respectively (see FIG. 1).

A support plate 77 is arranged between the insulating plate 36b and the end plate 52b. A cooling water turn passage 78, which communicates with the cooling water inlet passage 70 and the cooling water outlet passage 71, is formed on an end surface of the support plate 77 disposed on the cell unit 12. A plurality of unillustrated support shafts are fixed on another end surface disposed on the end plate 52b. Further, coned disc springs 42 are supported on the respective support shafts.

The case 54 comprises a bottom plate 80, a first side plate 82a, a second side plate 82b, and a ceiling plate 84. These members are fastened to one another by bolts 86. That is, a plurality of bolt holes 92, 92 are provided through rising sections 88, 88 which are formed by bending portions of both side surfaces of the bottom plate 80 vertically upwardly and through hanging sections 90, 90 which are formed by bending portions of both side surfaces of the ceiling plate 84 vertically downwardly respectively. Stepped edge sections 94, 94 are provided at both side surfaces of the first side plate 82a and the second side plate 82b. Bolt holes 96, 96 are provided through the respective stepped edge sections 94, 94 at positions corresponding to the respective bolt holes 92, 92 of the rising sections 88, 88 and the hanging sections 90, 90 respectively. The respective bolts 86 pass through the bolt holes 96, and they are screw-engaged with the bolt holes 92. That is, the case 54 is composed of the four plates 80, 82a, 82b, 84 which are detachable from each other. Both ends of the case 54 form open ends.

Cutout grooves 98, 98, which allow terminals 97, 97 of the terminal electrodes 34a, 34b to protrude, are provided through the ceiling plate 84.

A plurality of tab sections 100a to 100c protrude at respective both ends of the bottom plate 80, the first side plate 82a, the second side plate 82b, and the ceiling plate 84 respectively. The tab sections 100a, 100c of the bottom plate 80 or the ceiling plate 84 are formed at positions at which the tab sections 100a, 100c are meshed with the tab sections 72a on the upper and lower side surfaces of the end plates 52a, 52b respectively (see FIG. 4). The tab sections 100b of the first side plate 82a or the second side plate 82b are formed at positions at which the tab sections 100b are meshed with the tab sections 72b and the mounting boss sections 74 on the right and left side surfaces of the end plates 52a, 52b respectively.

Through-holes 102 are also provided through the tab sections 100a to 100c of the bottom plate 80, the first side plate 82a, the second side plate 82b, and the ceiling plate 84. Therefore, in a state shown in FIG. 4, the through-holes 75 of the tab sections 72a, 72b and the through-holes 102 of the tab sections 100a to 100c are superimposed with each other.

Pins 104 (see FIG. 1) are engaged with the through-holes 75, 102 which are superimposed with each other respectively. That is, the end plates 52a, 52b are connected to the both open ends of the case 54 by the hinge mechanism 106. Upon the connection, the coned disc springs 42, which are arranged between the support plate 77 and the end plate 52b, are compressed. Therefore, the end plate 52b is always elastically urged by the coned disc springs 42 outwardly in the stacking direction of the cell units 12 (direction of the arrow A).

The coned disc springs 42 and the support shafts for supporting the coned disc springs 42 are inserted into recesses 108 which are provided on one end surface of the end plate 52b.

As described above, in the fuel cell stack 50 according to the embodiment of the present invention, the tab sections 72a, 72b, 100a to 100c are provided for the end plates 52a, 52b and the case 54 respectively, and the pins 104 are inserted into the through-holes 75, 102 of the tab sections 72a, 72b, 100a to 100c to form the hinge mechanism 106. Thus, the end plates 52a, 52b are connected to the case 54. It is sufficient that the tab sections 72a, 72b, 100a to 100c slightly protrude from the end plates 52a, 52b and the case 54. Therefore, the external size of the end plate 52a, 52b can be smaller than the backup plate 40a, 40b which requires the hole formation margin S (see FIG. 6) to provide the through-hole 44 for allowing the tie rod 46 (see FIG. 5) to pass therethrough. In other words, it is possible to miniaturize the fuel cell stack 50. Therefore, the fuel cell stack 50 carried on an automobile body does not require any wide space.

Further, the end plates 52*a*, 52*b* and the case 54 are connected to one another by the pins 104. Therefore, even when the thin-walled end plates 52*a*, 52*b* are used, the tightening force is substantially equivalently applied to the cell units 12. Further, it is possible to use the end plates 52*a*, 52*b* each having a light weight, and it is unnecessary to use the backup plates 40*a*, 40*b* unlike the conventional fuel cell stack 10. That is, the fuel cell stack 50 has a light weight.

Further, the case 54 is formed by the four plates 80, 82*a*, 82*b*, 84 which are detachable from each other. Therefore, the cell units 12 can be accommodated in the case 54 with ease.

In this arrangement, the case 54 made of a metal material is spaced by a predetermined distance from the terminal electrodes 34*a*, 34*b*. Therefore, any electric leakage is avoided. The end plates 52*a*, 52*b* are electrically insulated from the terminal electrodes 34*a*, 34*b* by the insulating plates 36*a*, 36*b*. Therefore, no current flows from the end plates 52*a*, 52*b* to the case 54.

The fuel cell stack 50 is arranged at a predetermined position on the unillustrated automobile body. After that, unillustrated bolts, which are inserted into the through-holes 76, 76 of the respective mounting boss sections 74, 74 of the end plates 52*a*, 52*b*, are screw-engaged with bolt holes of the automobile body. Thus, the fuel cell stack 50 is positioned and fixed on the automobile body.

In this state, a hydrogen-containing gas supply source and an oxygen-containing gas supply source, both of which are not shown, are connected to the first and second gas inlet passages 62, 66 of the end plate 52*a* respectively. A gas recovery mechanism, which is not shown, is connected to each of the first and second gas outlet passages 64, 68. Further, an unillustrated cooling water supply source is connected to the cooling water inlet passage 70 of the end plate 52*a*. An unillustrated cooling water recovery mechanism is connected to the cooling water outlet passage 71.

The fuel cell stack 50 is operated as follows.

At first, an unillustrated heater, which is arranged near the fuel cell stack 50, is energized. Accordingly, the fuel cell stack 50 is heated, and its temperature is raised up to a predetermined operation temperature.

After the temperature of the fuel cell stack 50 is raised, the hydrogen-containing gas and the oxygen-containing gas are supplied from the hydrogen-containing gas supply source and the oxygen-containing gas supply source respectively. Especially, the hydrogen-containing gas arrives at the electrode catalyst layer of the anode 14 via the first gas inlet passage 62 and the first gas flow passage 24. The hydrogen in the hydrogen-containing gas is ionized on the electrode catalyst layer in accordance with the reaction formula (A). The components other than hydrogen and the unreacted hydrogen in the hydrogen-containing gas are fed to the gas recovery mechanism via the first gas flow passage 24 and the first gas outlet passage 64.

The hydrogen ion, which is generated by the ionization, is permeated through the electrode catalyst layer 18, and the hydrogen ion arrives at the electrode catalyst layer of the cathode 16. The electron is extracted out of the fuel cell stack 50 by the terminal electrode 34*a*. The electron is used as electric energy for energizing an unillustrated load such as a motor. After that, the electron arrives at the electrode catalyst layer of the cathode 16 via the terminal electrode 34*b*.

On the other hand, the oxygen-containing gas arrives at the electrode catalyst layer of the cathode 16 via the second gas inlet passage 66 and the second gas flow passage 26. The oxygen in the oxygen-containing gas is mutually bonded to the hydrogen ion and the electron arrived at the electrode catalyst layer in accordance with the reaction formula (B). The components other than oxygen in the oxygen-containing gas, the unreacted oxygen, and the generated steam are fed to the gas recovery mechanism via the second gas flow passage 26 and the second gas outlet passage 68.

The operation temperature of the fuel cell stack 50 is raised while it is thus operated. Therefore, the cooling water is supplied from the cooling water supply source to cool the fuel cell stack 50. The cooling water flows in the direction of the arrow A (see FIG. 1) via the cooling water inlet passage 70 of the fuel cell stack 50. After that, the cooling water is introduced into the cooling water outlet passage 71 via the cooling water turn passage 78 of the support plate 77. The cooling water is finally recovered by the cooling water recovery mechanism.

The operating fuel cell stack 50 causes thermal expansion. The coned disc springs 42 are compressed or elongated depending upon the amount of thermal expansion. Therefore, the tightening force applied on the cell stack 13 is kept substantially equivalent even in the thermally expanded fuel cell stack 50. Accordingly, the electric contact between the separators 60*a*, 60*b* and the unified bodies 20 is maintained suitably. Therefore, it is possible to avoid the deterioration of the power generation characteristics of the fuel cell stack 10.

Further, in this arrangement, the end plates 52*a*, 52*b* and the case 54 are connected to one another by the hinge mechanism 106. Therefore, for example, when the amount of thermal expansion of the fuel cell stack 50 is larger than that of the case 54, the end plates 52*a*, 52*b* are flexibly bent at central portions with ease so that the end plates 52*a*, 52*b* are expanded outwardly in the stacking direction (direction of the arrow A) of the fuel cell stack 50. Accordingly, the thermal expansion of the fuel cell stack 50 is not obstructed even when the cell units 12 are accommodated in the case 54. Therefore, it is possible to suppress the thermal stress which would be otherwise exerted on the fuel cell stack 50. Consequently, it is possible to avoid the deformation of the fuel cell stack 50 which would be otherwise caused by the thermal stress. Therefore, it is possible to maintain the mutual electric contact between the constitutive members of the fuel cell stack 50 suitably.

In this arrangement, the case 54 is spaced from the terminal electrodes 34*a*, 34*b* by such a distance that both of them do not contact with each other even when they are subjected to the thermal expansion.

As described above, in the embodiment of the present invention, the cell stack 13 is accommodated in the case 54, and the end plates 52*a*, 52*b* are connected to the open ends of the case 54 by the hinge mechanism 106. Therefore, the fuel cell stack 50 can have the compact size and the light weight. Further, it is possible to obtain the substantially equivalent tightening force exerted on the cell stack 13. Accordingly, the constitutive members of the fuel cell stack 50 can be electrically contacted with each other.

In the above embodiment, the case 54 is electrically insulated from the terminal electrodes 34*a*, 34*b* by spacing the case 54 and the terminal electrodes 34*a*, 34*b* from each other by the predetermined distance. Alternatively, the inner surface of the case 54 may be coated with an insulating material such as insulating rubber and polytetrafluoroethylene to insulate the case 54 from the terminal electrodes 34*a*, 34*b*.

As explained above, according to the fuel cell stack of the present invention, the stack of the cell units of the fuel cell stack is accommodated in the case, and the thin-walled end plates are connected to the open ends of the case by the hinge mechanism. Therefore, it is unnecessary to provide the backup plates. Further, the external size is extremely smaller than the fuel cell stack in which the backup plates are connected to one another, for example, by the tie rods. That is, the fuel cell stack can have the compact size and the light weight.

Further, it is possible to avoid the deterioration of the power generation characteristics of the fuel cell stack, because the constitutive members of the fuel cell stack can electrically contact with each other.

Furthermore, it is easy to accommodate the cell units in the case, because at least one end surface of the case is detachable.

Moreover, the thermal expansion of the fuel cell stack is not obstructed, because the end plates and the case are connected to one another by the hinge mechanism. Therefore, it is possible to suppress the thermal stress which would be otherwise exerted on the fuel cell stack.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising a stack including a predetermined number of cell units electrically connected to one another in series, said cell units each including a unified body and a pair of separators for supporting said unified body interposed between said pair of separators, said unified body having an anode supplied with a fuel gas, a cathode supplied with an oxygen-containing gas, and an electrolyte arranged between said anode and said cathode, and said pair of separators each having a fuel gas supply passage for supplying said fuel gas or an oxygen-containing gas supply passage for supplying said oxygen-containing gas, said fuel cell stack further comprising end plates arranged outside of said stack with terminal electrodes interposed between said end plates and said stack, wherein said stack and said terminal electrodes are accommodated in a case having at least one detachable side surface, and said end plates are connected to open ends of said case by a hinge mechanism.

2. The fuel cell stack according to claim 1, wherein said case is made of a metal material, and said case is spaced from said terminal electrodes.

3. The fuel cell stack according to claim 1, wherein said case is made of a metal material, and an internal surface of said case is coated with an insulating material.

4. The fuel cell stack according to claim 1, wherein said fuel cell stack is carried on an automobile body, and each of said end plates has a mounting boss section for inserting a connecting member in order to connect said fuel cell stack and said automobile body to one another.

5. The fuel cell stack according to claim 2, wherein said fuel cell stack is carried on an automobile body, and each of said end plates has a mounting boss section for inserting a connecting member in order to connect said fuel cell stack and said automobile body to one another.

6. The fuel cell stack according to claim 3, wherein said fuel cell stack is carried on an automobile body, and each of said end plates has a mounting boss section for inserting a connecting member in order to connect said fuel cell stack and said automobile body to one another.

* * * * *